(12) United States Patent
Howland et al.

(10) Patent No.: US 8,271,956 B2
(45) Date of Patent: Sep. 18, 2012

(54) SYSTEM, METHOD AND PROGRAM PRODUCT FOR DYNAMICALLY ADJUSTING TRACE BUFFER CAPACITY BASED ON EXECUTION HISTORY

(75) Inventors: Michael J. Howland, Endicott, NY (US); Paul E. Rogers, Johnson City, NV (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 12/027,469

(22) Filed: Feb. 7, 2008

(65) Prior Publication Data

US 2009/0204949 A1    Aug. 13, 2009

(51) Int. Cl.
*G06F 9/44* (2006.01)
*G06F 9/45* (2006.01)

(52) U.S. Cl. ........ 717/128; 717/130; 717/131; 717/132; 717/133; 717/155

(58) Field of Classification Search .................. None
See application file for complete search history.

(56) References Cited

U.S. PATENT DOCUMENTS

| | | | | |
|---|---|---|---|---|
| 5,274,811 | A * | 12/1993 | Borg et al. ........... | 717/133 |
| 6,202,199 | B1 * | 3/2001 | Wygodny et al. ........... | 717/128 |
| 6,282,701 | B1 * | 8/2001 | Wygodny et al. ........... | 717/128 |
| 6,351,844 | B1 | 2/2002 | Bala | |
| 6,598,012 | B1 * | 7/2003 | Berry et al. ........... | 717/130 |
| 6,651,243 | B1 * | 11/2003 | Berry et al. ........... | 717/132 |
| 6,728,949 | B1 * | 4/2004 | Bryant et al. ........... | 717/130 |
| 6,912,673 | B1 * | 6/2005 | Wyland ........... | 714/43 |
| 6,988,263 | B1 * | 1/2006 | Hussain et al. ........... | 717/155 |
| 7,058,928 | B2 * | 6/2006 | Wygodny et al. ........... | 717/128 |
| 7,260,692 | B1 * | 8/2007 | Zahavi et al. ........... | 711/154 |
| 7,389,497 | B1 * | 6/2008 | Edmark et al. ........... | 717/130 |
| 7,437,618 | B2 * | 10/2008 | Al-Omari et al. ........... | 714/45 |

(Continued)

OTHER PUBLICATIONS

Quinn Jacobson et al., Path-Based Next Trace Prediction, IEEE 1072-4551/97, 1997, [Retrieved on Apr. 23, 2012]. Retrieved from the internet: <URL: http://dl.acm.org/citation.cfm?id=266802> 10 Pages. (14-23).*

(Continued)

*Primary Examiner* — Don Wong
*Assistant Examiner* — Anibal Rivera
(74) *Attorney, Agent, or Firm* — Cantor Colburn LLP; Dennis Jung

(57) ABSTRACT

A method, system and program product for dynamically adjusting trace buffer capacity based on execution history. The method includes receiving, by a module configured to trace, a plurality of traces pertaining to one or more trace events generated during execution of a program being traced, the trace events generated including panel data and sequence data. The method further includes determining, using trace data captured from the plurality of traces received, whether or not a path for a trace event is a new path. If the path for the trace event is determined to be a new path, the method includes dynamically adjusting, by the module, an initial size of a trace buffer configured to store the trace data captured, such that, the module increases the initial size of the trace buffer upon making a determination that the trace event is a new trace event based on execution history.

20 Claims, 6 Drawing Sheets

U.S. PATENT DOCUMENTS

| | | | |
|---|---|---|---|
| 2003/0145255 A1 | 7/2003 | Harty et al. | |
| 2004/0221115 A1 | 11/2004 | Sahin et al. | |
| 2004/0225870 A1* | 11/2004 | Srinivasan et al. | 712/235 |
| 2005/0071817 A1* | 3/2005 | DeWitt et al. | 717/131 |
| 2005/0120337 A1* | 6/2005 | Serrano et al. | 717/127 |
| 2005/0223364 A1* | 10/2005 | Peri et al. | 717/128 |
| 2006/0020918 A1* | 1/2006 | Mosberger | 717/131 |
| 2006/0212841 A1* | 9/2006 | Sinai et al. | 717/105 |
| 2006/0242627 A1* | 10/2006 | Wygodny et al. | 717/128 |
| 2007/0006165 A1 | 1/2007 | Lam et al. | |
| 2008/0134148 A1* | 6/2008 | Clark | 717/128 |

OTHER PUBLICATIONS

Eric Rotenberg et al., Trace Cache: a Low Latency Approach to High Bandwith Instrcution Fetching, IEEE 1072-4451/96, 1996, [Retrieved on Apr. 23, 2012]. Retrieved from the internet: <URL: http://dl.acm.org/citation.cfm?id=243854> 11 Pages (24-34).*

Eric Rotenberg et al., Trace Processors, IEEE 1072-4451/97, 1997, [Retrieved on Apr. 23, 2012]. Retrieved from the internet: <URL: http://ieeexplore.ieee.org/stamp/stamp.jsp?tp=&arnumber=645805>11 Pages (138-148).*

* cited by examiner

SYSTEM, METHOD AND PROGRAM PRODUCT FOR DYNAMICALLY ADJUSTING TRACE BUFFER CAPACITY BASED ON EXECUTION HISTORY

FIELD OF THE INVENTION

The present invention relates to computer systems and software, and more specifically to an automated technique for dynamically adjusting trace buffer capacity based on execution history.

BACKGROUND OF THE INVENTION

Software programmers in businesses and/or organizations are often required to identify critical information about code segments and data structures in a computer program for code optimization. One technique for obtaining such critical information is tracing, which provides a view into the behavior of a program by recording the time and details of the state of the program at relevant points in the operation of the program. For instance, a dedicated routine monitors the progress of the program and provides a detailed record of the program's execution path and stores the detailed record in a storage location or buffer, such as, in memory. The size and amount of memory utilized in tracing is typically limited by cost considerations. Accordingly, software programmers want to ensure that all aspects of a computer code employed are operational and that any critical situations that may occur are not missed during tracing. As such, there is a need to effectively monitor a computer program and to preserve key trace information without affecting costs or performance.

SUMMARY OF THE INVENTION

The present invention resides in a system, method and program product for dynamically adjusting trace buffer capacity based on execution history. The method includes receiving, by a first module configured to trace, a plurality of traces pertaining to one or more trace events generated during execution of a program being traced, the one or more trace events generated including panel data and sequence data, determining, using trace data captured from the plurality of traces received, whether or not a path for a trace event of the one or more trace events is a new path. If the path for the trace event is determined to be a new path, dynamically adjusting, by the first module, an initial size of a trace buffer configured to store the trace data captured, such that, the first module increases the initial size of the trace buffer upon making a determination that the trace event is a new trace event based on execution history of the program being traced. The method further includes forwarding, to a second module configured to trace, the plurality of traces pertaining to the one or more trace events generated during execution of the program being traced. The method further includes restoring the initial size of the trace buffer when the first module determines that the new path is a valid path and committing to memory the new path. In an embodiment, the receiving step further includes storing by the first module the trace data captured for the plurality of traces generated during execution of the program in the trace buffer within a data storage system. In an embodiment, the determining step further includes maintaining the initial size of the trace buffer for capturing the trace data for the plurality of trace events, if the path for the trace event is determined not to be a new path. In an embodiment, the determining step further includes determining if the new path is an invalid path, if the path for the trace event is determined to be a new path, determining if the new path is an invalid path, and maintaining increase of the initial size of the trace buffer for capturing the trace data for the trace event of the plurality of trace events, if the new path is an invalid path and not committing to memory the invalid path. In an embodiment, the program is a hardware managing and monitoring program, the first module is an external tracing module and the second module is a tracing module associated with the hardware managing and monitoring program.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
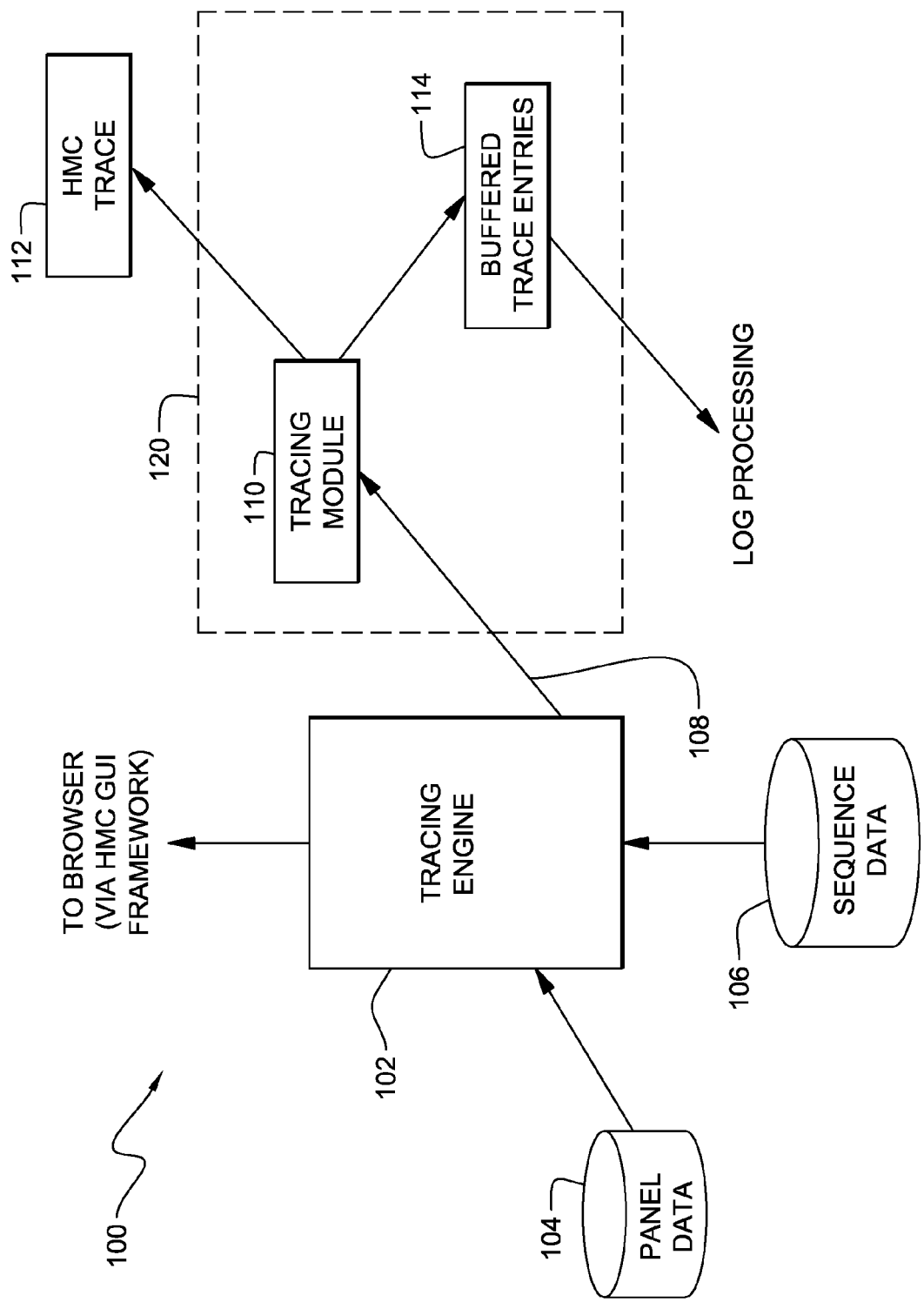
FIG. 1 is a schematic block system diagram illustrating an embodiment of a computer system having deployed thereon a tracing engine and a tracing tool for dynamically adjusting trace buffer capacity based on execution history, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Reference is now made to FIG. 1, reference numeral 100, which depicts a schematic block system diagram illustrating one embodiment of a computer system or infrastructure 100, such as, a standalone or personal computer or a server that has deployed thereon or is coupled to a system that has deployed thereon a commercially available application for managing and monitoring a mainframe computer or server, such as, the HMC (Hardware Management Console) application or program that is commercially available from International Business Machines Corporation (IBM). In an embodiment, the IBM® HMC (Hardware Management Console) application deployed on the computer system 100 uses its network connections to one or more servers to perform various management functions. The IBM® HMC (Hardware Management Console) program provides a standard user interface that enables a system administrator to manage configuration and operation of partitions in servers as well as to monitor the servers for hardware problems. Further, as shown in FIG. 1, the IBM® HMC (Hardware Management Console) application includes a tracing engine, for instance, a PSXML (Program Sequence Extensible Markup Language) engine 102, which in an embodiment, provides panel/program sequence control over panel and non-panel program flows for several users of the tracing system. In an embodiment, the PSXML engine 102 accepts displayable panel data 104, such as, XHTML (Extensible HyperText Markup Language) data and sequence data 106, such as, in a PSXML (Program Sequence Extensible Markup Language) file/document and combines the panel data 104 and sequence data 106 to form an execution flow. In an embodiment, the panel data 104 is used to form the presentation for a given panel (for instance, what the panel will look like) and the sequence data 106 in a PSXML file, which contains all of the navigation transitions and other required information, is used to link information together based on user action(s) and/or programmatic action(s). As such, the PSXML engine 102 uses the panel data 104 and sequence data 106 during its execution. Accordingly, as the PSXML engine 102 executes, the PSXML engine 102 generates numerous trace events or trace entries or trace statements based on user and/or programmatic interaction with the PSXML engine 102. Accordingly, the trace entries or events emitted provide a detailed record of the program's execution path. The trace entries or statements emitted by the PSXML engine 102 are sent or passed on (indicated by arrow 108) to a tracing tool or module, for instance, the PseqTrace module 110. In an embodiment, the PseqTrace module 110 is part of a tracing utility package within the trace system and is used during the execution of the PSXML engine 102 to trace operation of the PSXML engine 102. It is understood by one skilled in the art that other tracing programs and tracing tools may be used to trace execution history of a program. Further, as shown in FIG. 1, the trace events or entries or statements received from the PSXML engine 102 are passed on to the HMC trace module 112, which in an embodiment, is a general or open agency trace that is used by other components within the system or infrastructure 100. In an embodiment, the PseqTrace module 110 evaluates or tracks any changes to a trace entry or event by determining whether or not an execution path through the PSXML engine 102 appears to be normal, for instance, if the path has been traced previously or whether or not an execution path appears to be abnormal, for instance, if the path is a new path, as explained further herein below. Further, the PseqTrace module 110 stores the trace entries or trace events in a buffer or a storage, for instance, in a trace buffer or in memory. Trace entries are maintained in a queue implemented with a linked list data structure. The oldest entries are allowed to fall off the end of the queue to maintain the buffer size limitations. The information or data provided by the stored trace entries or buffered trace entries 114 are further gathered or collected for logs during log processing of the buffered trace entries 114. In FIG. 1, the dotted box, reference numeral 120, is used to represent the different processes or steps carried out by the PseqTrace module 110. In an embodiment, the size or capacity of the trace buffer or storage is set to an initial or preset or predetermined size, for instance, to a preset size of 10 kilobytes for capturing and storing the buffered trace entries or data.

Figure 2:
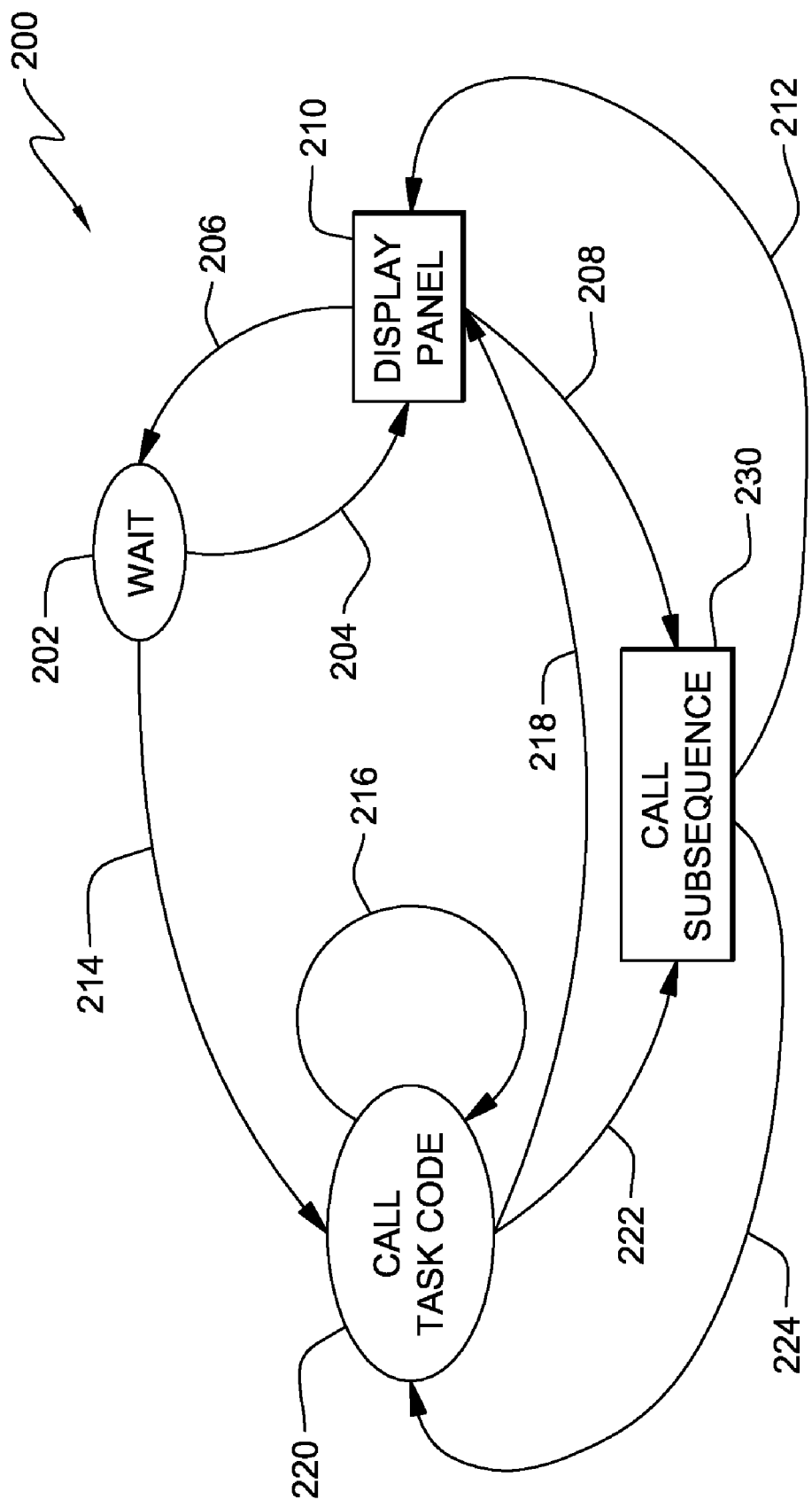
FIG. 2 depicts a state diagram of trace events emitted corresponding to execution flows through a tracing engine and monitored by a tracing tool for tracking changes and adjusting trace buffer capacity based on execution history, in accordance with an embodiment of the present invention.
Figure 3:
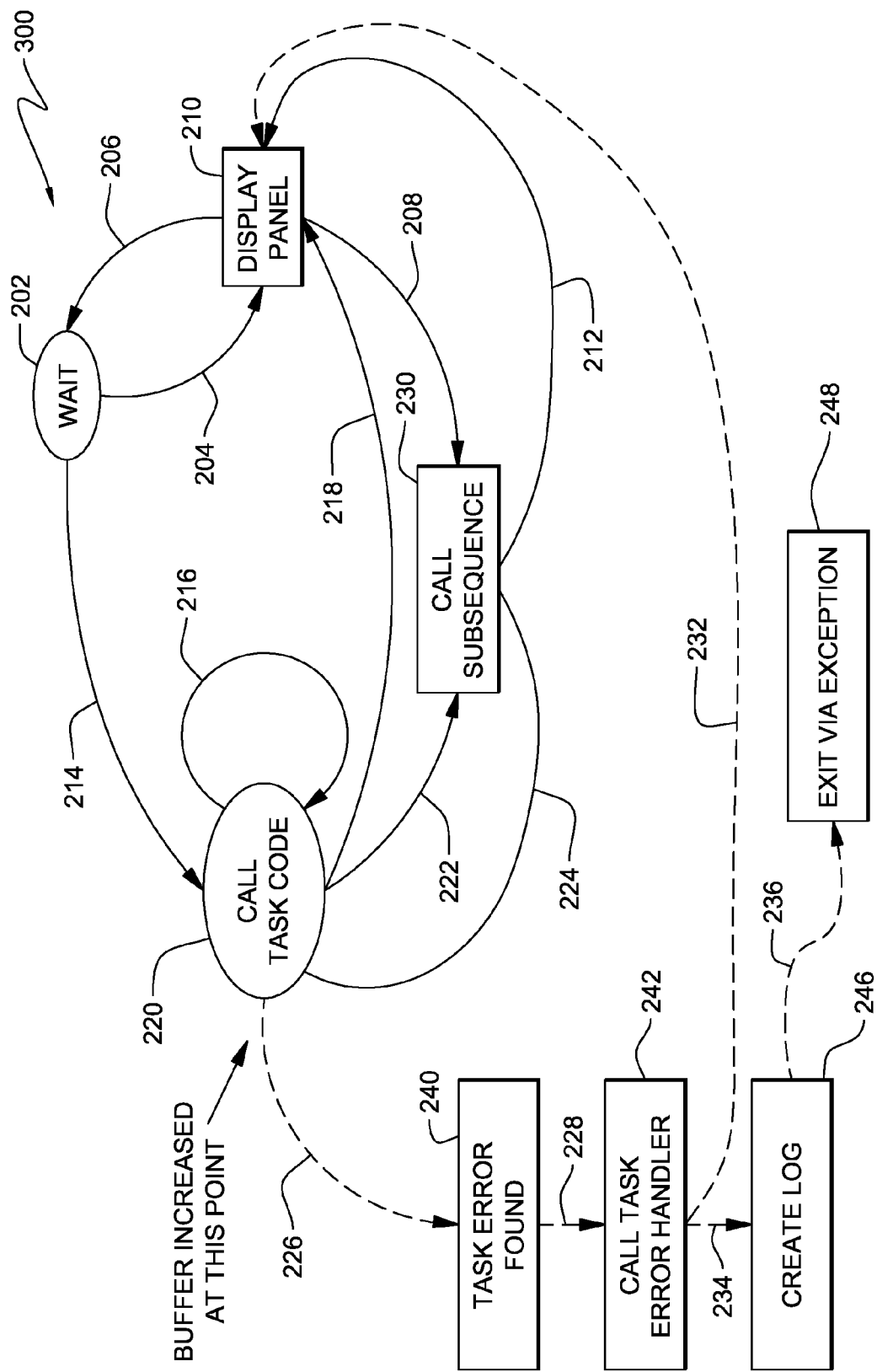
FIG. 3 depicts a state diagram of trace events emitted corresponding to execution flows through a tracing engine and monitored by a tracing tool for tracking changes and adjusting trace buffer capacity based on execution history, in accordance with an embodiment of the present invention.

Reference is now made to FIGS. 2 and 3, which together illustrate how the PseqTrace module (reference numeral 110 in FIG. 1) evaluates or analyzes the trace events or entries emitted by the PSXML engine (reference numeral 102 in FIG. 1) during execution of the PSXML engine and dynamically adjusts the buffer capacity or size based on execution history. Turning to FIG. 2, reference numeral 200 depicts a state diagram representing the trace events or entries that are emitted by the PSXML engine during execution of the PSXML engine, and where the trace events or entries are evaluated or analyzed by the PseqTrace module. Typically, the PSXML engine sits in a wait state or mode 202, waiting for an action or the next action. While the PSXML engine is in the wait state 202, the size of the trace buffer managed by the PseqTrace module for storing the trace events emitted by the PSXML engine is maintained at an initial buffer size, for instance, 10 kilobytes. Referring to FIG. 1, the wait state 202 of the PSXML engine may be interrupted programmatically or by a user, for instance, when the user presses a button. As shown in FIG. 1, a control flow (indicated by a solid arrow) flows out of the wait state 202, where the PSXML engine may be asked (indicated by arrow 204) to display a new panel (hence, transitioning to a display panel state, reference numeral 210) or the PSXML engine may wait until a task code is called (indicated by arrow 214), wherein the PSXML engine transitions to a call task code state, reference numeral 220. Further, for instance, the calling of a task code may lead (indicated by arrow 216) to the PSXML engine calling another task code, such that, the PSXML engine remains in the call task code state, reference numeral 220. Or in another instance, the calling of a task code may lead (indicated by arrow 218) to the PSXML engine transitioning from the call task code state 220 to another display panel state (reference numeral 210) or may lead (indicated by arrow 222) to the calling of another subsequence (thus, transitioning to a call subsequence state, reference numeral 230), which may lead (indicated by arrow 224) to the PSXML engine calling another task code, thus, transitioning back to the call task code state, reference numeral 220 or may instead lead (indicated by arrow 212) to transitioning from the call subsequence state 230 to a display panel state 210. Further, as shown in FIG. 2, the PSXML engine may transition from the display panel state, reference numeral 210 back (indicated by arrow 206) to the wait state (reference numeral 202) or may transition (indicated by arrow 208) to the call subsequence state 230. Accordingly, the PseqTrace module monitors each of the trace events emitted during the execution of the PSXML engine as per the state transitions discussed herein above and determines whether or not an execution flow is typical, that is, an execution flow that has been run previously, or whether or not an execution flow is atypical or not normal, that is, either the execution flow has not been run previously or is new. If the PseqTrace module determines that the execution flow is normal or typical, then the PseqTrace module maintains the buffer size initially set, for instance, the buffer size of 10 kilobytes. However, if the PseqTrace module determines that the execution flow is new or abnormal or atypical, then the PseqTrace module increases the buffer size initially set, for instance, from the initial buffer size of 10 kilobytes to an increased buffer size, for instance, of 100 kilobytes, as described further herein below with respect to FIG. 3. In an embodiment, the current size of the queued trace entries in the buffer is maintained. If there is inadequate space for a new entry (the latest trace entry), the oldest entries are pruned (oldest first) until enough room exists in the queue for the latest trace entry or message. When the trace buffer size is increased, the threshold where this pruning needs to occur is simply increased in size. Similarly, when it is time to reduce the amount of data stored, this threshold is reduced. After the reduction, the next trace message to arrive will cause the buffer to prune itself (in order to allow the addition of the newest trace entry).

Turning to FIG. 3, reference numeral 300 depicts a state diagram representing the trace events or entries that are emitted by the PSXML engine during execution of the PSXML engine, where the trace events or entries are evaluated or analyzed by the PseqTrace module. As discussed hereinabove with respect to FIG. 2, typically, the PSXML engine sits in a wait state 202, waiting for an action. The wait state 202 may be interrupted programmatically or by a user, for instance, when the user presses a button. As shown in FIG. 1, a control flow (indicated by a solid arrow) flows out of the wait state 202, where the PSXML engine may be asked (indicated by arrow 204) to display a new panel (hence, transitioning to a display panel state, reference numeral 210) or the PSXML engine may wait until a task code is called (indicated by arrow 214), wherein the PSXML engine transitions to a call task code state, reference numeral 220. Further, for instance, the calling of a task code may lead (indicated by arrow 216) to the PSXML engine calling another task code, such that, the PSXML engine remains in the call task code state, reference numeral 220. In FIG. 3, given that the execution flows depicted by the solid arrows have already been described hereinabove with respect to FIG. 2, the remainder of the description for the execution flows depicted by solid arrows in FIG. 3 will not be repeated. However, referring to dotted arrows shown in FIG. 3, under certain circumstances, the PSXML engine may transition from a wait state (reference numeral 202) to a call task code state 220 and the PSXML engine may encounter an error or a problem (indicated by dotted arrow 226 from call task code, reference numeral 220 to task error found, reference numeral 240). For instance, during execution of the PSXML engine, the PSXML engine may call a task code and may discover an error, for instance, that the class (a portion of code needed to run the task code, for instance, a Java Class) is not found, and as a result, the PSXML engine, for instance, calls a task error handler (reference numeral 242). Further, the PSXML engine creates a log for the task error (reference numeral 246) and exits execution via an error exception (reference numeral 248). On the other hand, the PseqTrace module monitoring the trace events emitted by the PSXML engine would evaluate or determine that the execution flow for the class task code called is not typical, for instance, that the execution flow has not been previously encountered. As such, the PseqTrace module increases (indicated by the dotted arrows 226, 228, 232, 234 and 236) the size of the preset trace buffer that stores the trace events, from the initial or preset buffer size (for instance, 10 kilobytes) to an increased buffer size, for instance, a buffer size of 100 kilobytes. Accordingly, even though trace entries or trace events continue to flow given that there may be a lot of transitions (as shown by the solid arrows) occurring during the execution of the PSXML engine, the chances of the buffered or stored trace events, from the wait state to the calling of the task code and discovering of the error, being flushed out of the trace buffer dramatically reduces, given that the size of the trace buffer has been increased (from 10 kilobytes to 100 kilobytes) to store additional trace data or trace events or entries. Moreover, if the PseqTrace module determines that the error that was suspected with respect to a trace event is in fact not an error, but rather a new execution flow or an unexpected execution flow, then the PseqTrace module reduces or decreases the buffer size from 100 kilobytes back down to the initial buffer size of 10 kilobytes. As such, in an embodiment, the PseqTrace module increases the size of the trace buffer temporarily every time a new or unexpected execution flow is discovered, but after evaluating the execution flow, the PseqTrace module reduces the size of the buffer that was temporarily increased back down to a preset size when the execution flow is determined to be a safe state. For instance, upon the calling of the task error handler (reference numeral 242), the PSXML engine may transition (indicated by dotted arrow 232) to a display panel state, reference numeral 210), which may lead the PSXML engine back to the wait state (via arrow 206). As such, although the increase in the preset buffer size is maintained during some of the trace events (as per the dotted arrows 226, 228, 232, 234 and 236), the PseqTrace module restores or reduces the increase in the preset buffer size or capacity back down to the preset buffer size (for instance, from 100 kilobytes to 10 kilobytes), upon determining that the execution flow is typical. Further, in an embodiment, the trace entries themselves are used to determine whether or not something is typical or not typical. Thus, as actions occur (for instance, a button is pressed or a module is called), all of the various trace information is logged and flows through the PseqTrace module. In an embodiment, the PseqTrace module uses the beginning or starting characters of a buffered trace entry, for instance, the first 10 to 15 characters of the buffered trace entry, to determine whether or not the execution path for the emitted trace event from the PSXML engine is a known or previously executed path or a new path that has not been previously encountered. In an embodiment, when the PseqTrace module is initialized it has no recollection of valid execution paths corresponding to trace events generated by the PSXML engine. In an embodiment, all trace events or entries corresponding to execution paths through the PSXML engine are considered 'new' and the preset trace buffer is immediately increased to account for this during early execution of the PseqTrace module. However, each time the PseqTrace module returns to a known safe state (for instance, when waiting for a new trace event to be generated by the PSXML engine), the preceding trace entries corresponding to execution paths through the PSXML engine are remembered or stored in a buffer or in memory. As such, when a trace entry arrives during the next execution cycle that matches an execution path corresponding to a trace entry that is remembered or stored, the trace buffer is not increased given that the execution path is considered to be a valid execution path. Accordingly, the PseqTrace module learns execution paths flowing through the PSXML engine as it learns and manages execution history, thus, eliminating the need to change trace statements in the PseqTrace module code.

Figure 4:
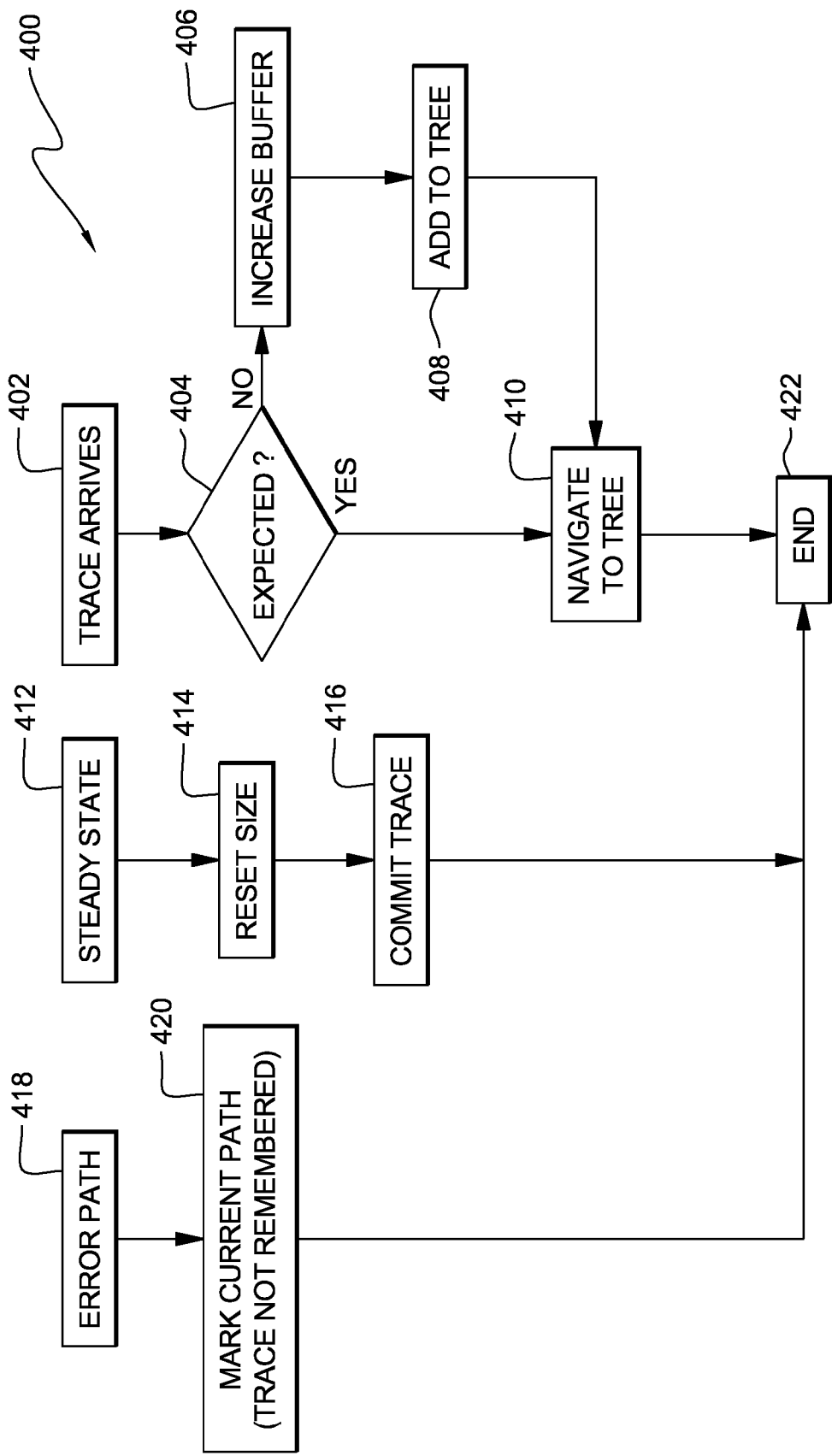
FIG. 4 is a flowchart outlining the steps performed by a trace tool for dynamically adjusting trace buffer capacity based on execution history of a program being traced, in accordance with an embodiment of the present invention.

In one embodiment, as shown in FIG. 4, the invention provides a method 400 for dynamically adjusting trace buffer capacity based on execution history of a program being traced. Turning to FIG. 4, reference numeral 400 outlines the steps carried out by a tracing program or module, namely, the PseqTrace module (discussed herein above) for dynamically adjusting the trace buffer capacity based on execution history of the program being traced, for instance, the PSXML engine being traced. The method begins with the PseqTrace module receiving a trace event or entry (in step 402) that is emitted from the PSXML engine as a result of execution flows through the PSXML engine. The method further includes determining by the PseqTrace module (in step 404), using trace data captured from the trace event received, whether or not an execution path corresponding to the trace event is an expected or known path. If the PseqTrace module determines that the execution path corresponding to the trace event received is not an expected or known path, the PseqTrace module increases, in step 406, the size or capacity of the trace buffer within a data storage system in which the trace events are stored or recorded for tracing purposes and adds the trace event data to a tree in step 408. In an embodiment, the tree is an acyclic connected graph, where each node of the tree may or may not reference subordinate child nodes. If child nodes are referenced, the child nodes represent the 'next expected' state for a transition. The absence of a child node indicates that no new state transitions are expected and should one occur, it would be considered 'new' (thus, causing the PseqTrace module to increase the size of the buffer). Likewise, if child nodes do exist, but the next arriving trace entry does not match one of the existing child nodes, the state is also considered new (and would, thus, result in the PseqTrace module increasing the buffer size). However, if the PseqTrace module determines in step 404 that the execution path corresponding to the trace event received is an expected or known path, or after the trace event is added to the tree buffer in step 408, the PseqTrace module navigates to the tree 410, ending the process at step 422. In an embodiment, the tree navigation is done relative to the 'current state'. When starting from the resting state (the wait state), the root of the tree is considered the current state. As trace events are received from the engine, the child nodes of the current node are checked for matches. If such a match is found, the path is considered non-new and the current state of the tree shifts to the child node. Subsequent trace entries are evaluated against new current state of the tree. Further, as shown in FIG. 4, when the PseqTrace module monitors execution paths corresponding to trace events emitted by the PSXML engine, if the PseqTrace module is notified by the PSXML engine that an error path is occurring (step 418) during execution, the PseqTrace module notes this fact by marking the current execution path (step 420), and takes steps to ensure that the newly added tree information is not remembered, thus, the error path will not be considered a normal or typical path should it occur again in the future. The process ends with step 422. Furthermore, as shown in FIG. 4, if the PseqTrace module is not invoked, that is, remains in a steady state (step 412), the PseqTrace module resets the buffer size (step 414) to the preset buffer size and commits trace (step 416) of the PSXML engine, ending the process at 422.

Figure 5:
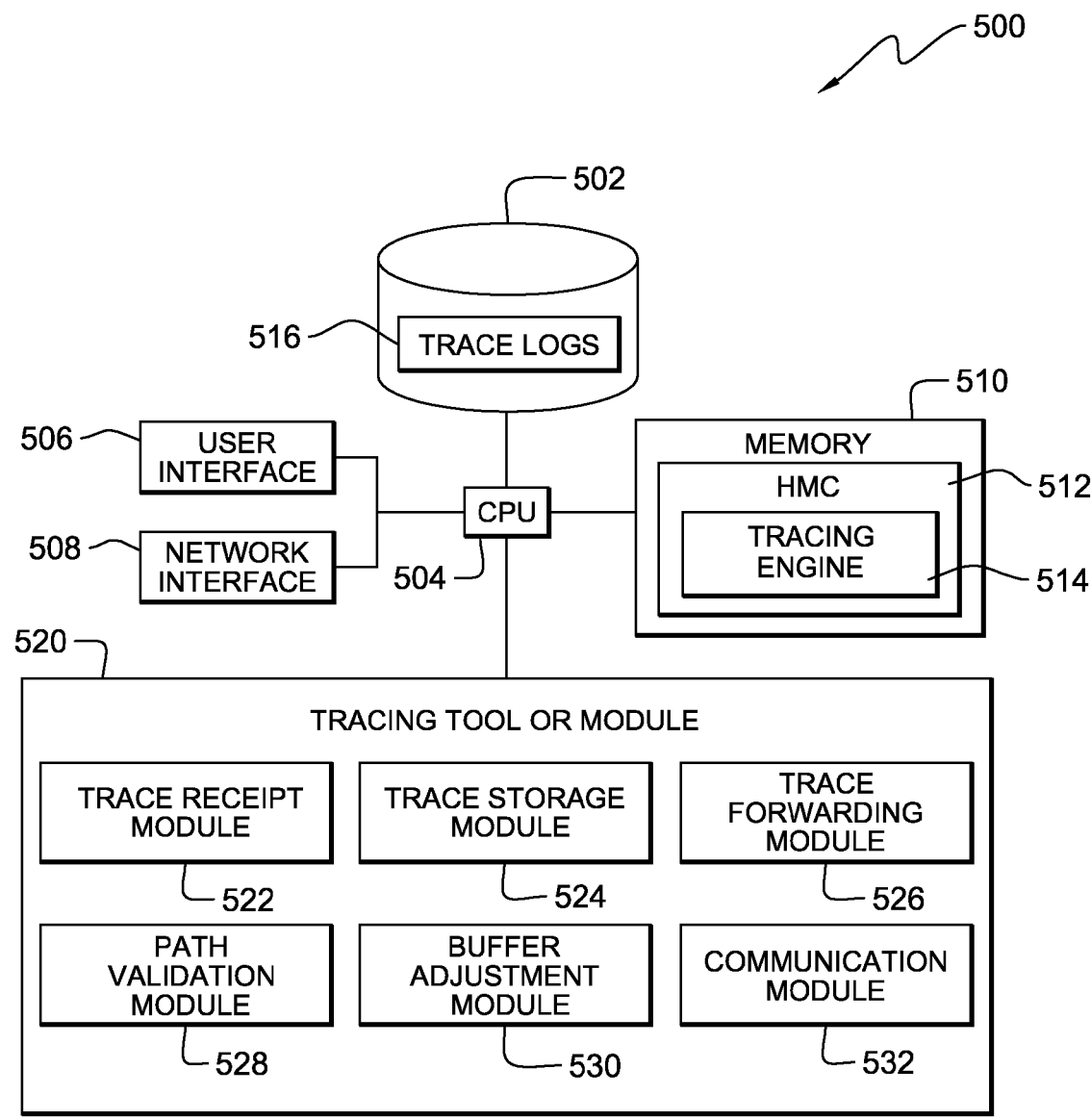
FIG. 5 is a schematic block system diagram illustrating an embodiment of a tracing system having deployed thereon a tracing engine and a tracing tool or code for dynamically adjusting trace buffer capacity based on execution history, in accordance with an embodiment of the present invention.

In another embodiment, the invention provides a system for dynamically adjusting trace buffer capacity based on execution history of a program being traced, in accordance with an embodiment of the present invention. Turning to FIG. 5, reference numeral 500 depicts a schematic block system diagram illustrating one embodiment of a computer system 500, such as, a standalone computer or a laptop that has deployed thereon the IBM® HMC (Hardware Management Console) application 512 (shown in memory 510) that includes a tracing engine, namely, a PSXML (Program Sequence Extensible Markup Language) engine 514, which in an embodiment, provides panel/program sequence control over panel and non-panel program flows for several users of the tracing system. In an embodiment, the PSXML engine 514 utilizes a tracing program or module, namely, the PseqTrace module 520 deployed on the system 500 for dynamically adjusting trace buffer capacity based on the traced execution history of the PSXML engine 514, as described herein above. As shown in FIG. 5, in an embodiment, the system 500 includes Preferably, the system 500 is a computer system that includes a central processing unit (CPU) 504, a local storage device 502, a user interface 506, a network interface 508, and a memory 510. The CPU 504 is configured generally to execute operations within the system 500, such as, the PSXML engine 514. The user interface 506, in one embodiment, is configured to allow a user to interact with the PSXML engine 514, including allowing input of data and commands from a user and communicating output data to the user. The network interface 508 is configured, in one embodiment, to facilitate network communications of the system 500 over a communications channel of a network (not shown in any of the drawings). In an embodiment, the local memory 510 is configured to store one or more applications or programs, such as the IBM® HMC (Hardware Management Console) application 512 that includes a tracing engine, namely, the PSXML (Program Sequence Extensible Markup Language) engine 514 running on the system 500 and being configured to provide panel/program sequence control over panel and non-panel program flows for several users of the tracing system. Further, in an embodiment, trace logs 516 generated from the buffered trace entries collected by the PseqTrace module 520 is stored within a storage system 502. Alternatively, the trace logs 516 may be stored in memory 510 or in a separate storage.

In one embodiment, as shown in FIG. 5, the PseqTrace module or tool 520 which runs on the system 500 comprises a logic unit that contains a plurality of modules configured to functionally execute the necessary steps of dynamically adjusting trace buffer capacity based on execution history of the PSXML engine 512. In particular, the PseqTrace module or tool 520 includes a trace receipt module 522, a trace storage module 524, a trace forwarding module 526, a path validation module 528, a buffer adjustment module 530 and a communication module 532. In an embodiment, the trace receipt module 522 is configured to receive the one or more trace events or entries emitted during execution of the PSXML engine 512. The trace storage module 524 is configured to store the one or more trace events being recorded in a trace buffer within system 500. In an embodiment, the trace buffer has a preset buffer size, for instance, a buffer size of 10 kilobytes. Further, the trace storage module 524 is configured to write to or store in a trace log 516 all the information or data gathered with respect to the trace events or entries. The trace forwarding module 526 is configured to forward the traces received to an open agency trace, such as, the HMC trace module that is utilized by other components within the HMC management infrastructure. Further, the path validation module 528 is configured to validate whether or not an execution path for a trace event captured by the PseqTrace module 520 is a valid execution path (that is, appears to be normal or typical, for instance, if the path has been traced previously) or whether or not an execution path appears to be abnormal or untypical, for instance, if the path is a new path, as explained herein above. The buffer adjustment module 530 is configured to boost or increase the preset buffer size of the trace buffer where the trace entries are stored when an execution path is determined to be a new execution path. Further, buffer adjustment module 530 is configured to restore or decrease the preset buffer size of the trace buffer that was increased when an execution path is determined to be a known execution path. Further, the communication module 532 is configured to permit communication between the various modules of the PseqTrace module or tool 520 and other components, such as, the storage 502, which stores the trace logs or files 516 and/or programs running in memory 510, such as, the IBM® HMC (Hardware Management Console) application 512. As mentioned herein above, the PseqTrace module 520 dynamically adjusts the buffer size or capacity of the trace buffer based on execution history, that is, whether or not an execution flow has been monitored previously during execution of the PSXML engine 512.

Figure 6:
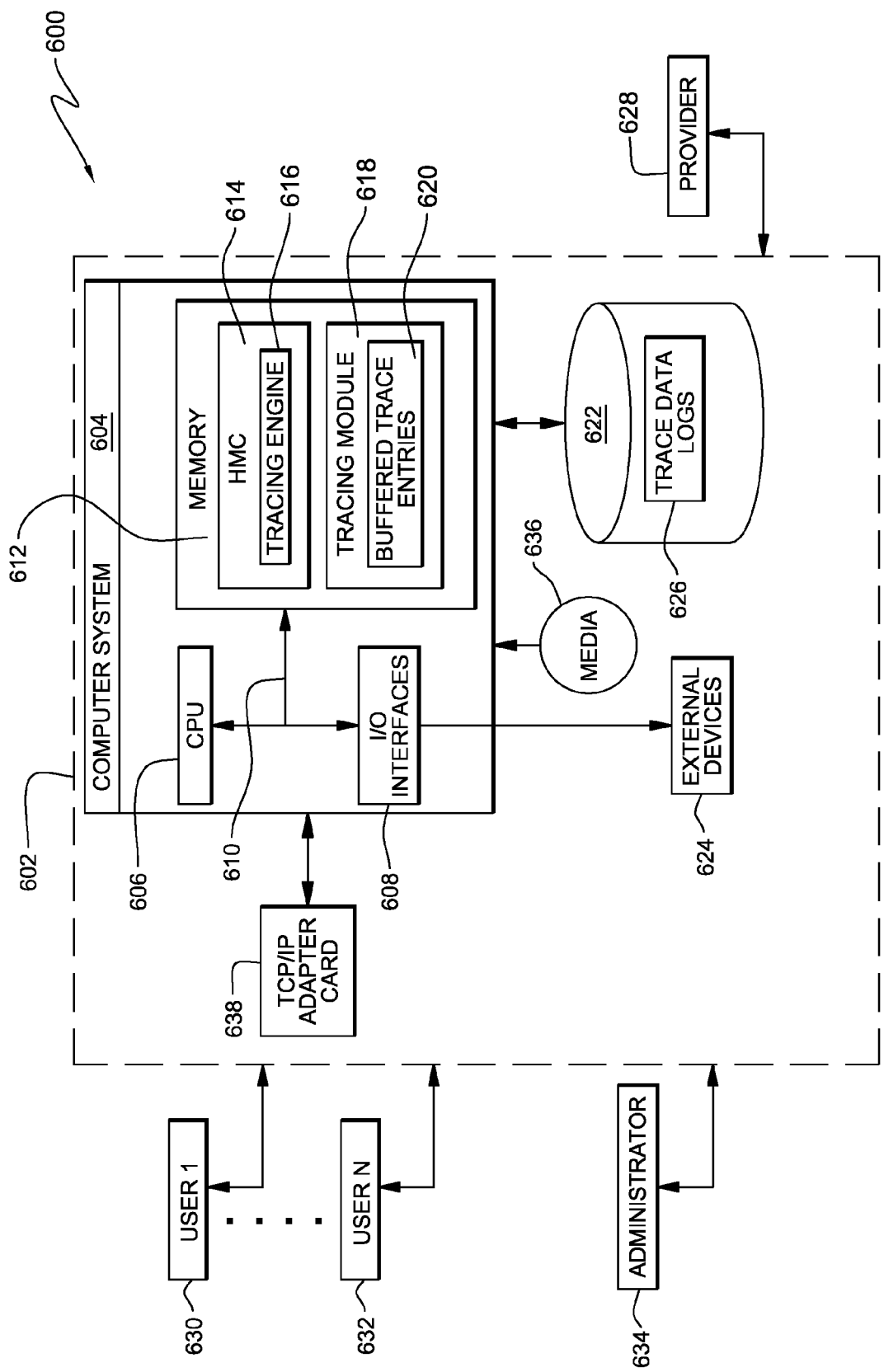
FIG. 6 is a schematic block system diagram of a buffer capacity tracing infrastructure for dynamically adjusting trace buffer capacity based on execution history, in accordance with an embodiment of the present invention.

Referring now to FIG. 6, there is illustrated a computer system 600 that includes a computer infrastructure 602 having a computer program product configured to dynamically adjust trace buffer capacity based on execution history, in accordance with an embodiment of the present invention. The computer program product comprises a computer readable or computer-usable medium, which provides program code, such as, the PSXML engine 616, part of the IBM HMC (Hardware Management Console) application 614 and the PseqTrace module or tool 618. The PSXML engine 616 and the PseqTrace module or tool 618 can be loaded into computer system 604 from a computer readable media 636, such as, a magnetic tape or disk, optical media, DVD, memory stick, semiconductor memory, etc. or downloaded from the Internet via a TCP/IP adapter card 638. As depicted in FIG. 6, system 600 includes a computer infrastructure 602, which is intended to represent any type of computer architecture that is maintained in a secure environment (i.e., for which access control is enforced). As shown, infrastructure 602 includes a computer system 604 that typically represents an application server or system 604 or the like that includes a tracing engine, such as, the PSXML engine 614 and the tracing tool, such as, the PseqTrace module 618 configured to dynamically adjust trace buffer capacity based on execution flow history. It should be understood, however, that although not shown, other hardware and software components (e.g., additional computer systems, routers, firewalls, etc.) could be included in infrastructure 602.

In general, user 1 (reference numeral 630) through user N (reference numeral 632) may access the computer system 604, which has deployed thereon the PSXML engine 616 and the PseqTrace module 618, which implements the invention. In an embodiment, the PseqTrace module or tool 618 is called or invoked by the PSXML engine 616 running on the computer system 604 to evaluate trace entries generated by the PSXML engine 616 during execution flow. It is understood that although the PseqTrace module or tool 618 is shown as being deployed on the same system as the PSXML engine 616, the PseqTrace module 618 may be deployed on another computer system within infrastructure 602.

As shown in FIG. 6, the tracing system 604 (which has implemented thereon the PseqTrace module or tool 618) is shown to include buffered trace entries 620 stored by the PseqTrace module 618. In particular, a user (user 1, reference numeral 630 through user N, reference numeral 632) accesses the PSXML engine 616 running on system 604 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 602 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi (Wired Fidelity) or other conventional communications standards could be used. Still yet, connectivity could be provided by conventional TCP/IP sockets-based protocol. In this instance, the parties could utilize an Internet service provider to establish connectivity to infrastructure 602. It should be understood that under the present invention, infrastructure 602 could be owned and/or operated by a party such as a virtual provider 640, or by an independent entity. Regardless, use of infrastructure 602 and the teachings described herein could be offered to the parties on a subscription or fee-basis. In either scenario, an administrator 634 could support and configure infrastructure 602, for instance, upgrading the PSXML engine 616 or the PseqTrace module 618 deployed on the tracing computer system 604.

The tracing computer system 604 is shown to include a CPU (hereinafter "processing unit 606"), a memory 612, a bus 610, and input/output (I/O) interfaces 608. Further, the tracing computer system 604 is shown in communication with external I/O devices/resources 624 and storage system 642. In general, processing unit 606 executes computer program code, such as the PSXML engine 616 and the PseqTrace module 618. While executing computer program code, the processing unit 606 can read and/or write data to/from memory 612, storage system 622, and/or I/O interfaces 608. For instance, in one embodiment, the PSXML engine 616 stores trace data logs 626 in storage 622. Alternatively, the data stored in storage 622 may be stored in a separate storage within the system 604. Bus 610 provides a communication link between each of the components in computer system 600, such that information can be communicated within the infrastructure 602. External devices 624 can comprise any devices (e.g., keyboard, pointing device, display, etc.) that enable a user to interact with computer system 600 and/or any devices (e.g., network card, modem, etc.) that enable server 604 to communicate with one or more other computing devices.

Computer infrastructure 602 is only illustrative of various types of computer infrastructures for implementing the invention. For example, in an embodiment shown, computer infrastructure 602 comprises two or more computing devices (e.g., a server cluster) that communicate over a network to perform the various process steps of the invention. Moreover, computer system 600 is only representative of various possible computer systems that can include numerous combinations of hardware. To this extent, in other embodiments, computer system 600 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 606 may comprise a single processing unit, or be distributed across one or more processing units in one or more locations, e.g., on a client and server. Similarly, memory 612 and/or storage system 642 can comprise any combination of various types of data storage and/or transmission media that reside at one or more physical locations. Further, I/O interfaces 608 can comprise any system for exchanging information with one or more external devices 624. Still further, it is understood that one or more additional components (e.g., system software, math co-processing unit, etc.) not shown in FIG. 6 can be included in computer system 600. However, if computer system 600 comprises a handheld device or the like, it is understood that one or more external devices 624 (e.g., a display) and/or storage system(s) 642 could be contained within computer system 604, and not externally as shown. Storage system 642 can be any type of system (e.g., a database) capable of providing storage for information under the present invention, such as the files to be preprocessed by the brokering virtual advertisement tool 616. To this extent, storage system 642 could include one or more storage devices, such as a magnetic disk drive or an optical disk drive. In another embodiment, storage system 642 includes data distributed across, for example, a local area network (LAN), wide area network (WAN) or a storage area network (SAN) (not shown). Although not shown, additional components, such as cache memory, communication systems, system software, etc., may be incorporated into computer system 600.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for dynamically adjusting trace buffer capacity based on execution history, said method comprising the steps of:

receiving, by a first module configured to trace, a plurality of traces pertaining to one or more trace events generated during execution of a program being traced, said one or more trace events generated including panel data and sequence data;

determining, using trace data captured from said plurality of traces received, whether or not a path for a trace event of said one or more trace events is a new path; and if said path for said trace event is determined to be said new path, dynamically adjusting by said first module an initial size of a trace buffer configured to store said trace data captured, wherein said first module increases said initial size of said trace buffer when said first module makes a determination that said trace event of said one or more trace events is said new trace event based on execution history of said program being traced.

2. A method according to claim 1, further comprising the steps of:

restoring said initial size of said trace buffer when said first module determines that said new path is a valid path; and committing to memory said new path.

3. A method according to claim 2, further comprising the step of:

forwarding, to a second module configured to trace, said plurality of traces pertaining to said one or more trace events generated during execution of said program being traced.

4. A method according to claim 3, wherein said receiving step further comprises the step of:

storing by said first module said trace data captured for said plurality of traces generated during execution of said program in said trace buffer within a data storage system.

5. A method according to claim 4, wherein said determining step further comprises the step of:

if said path for said trace event of said plurality of trace events is determined not to be said new path, maintaining said initial size of said trace buffer for capturing said trace data for said plurality of trace events.

6. A method according to claim 5, wherein said determining step further comprises the steps of:

if said path for said trace event of said plurality of trace events is determined to be said new path, determining if said new path is an invalid path; and if said new path is said invalid path, maintaining increase of said initial size of said trace buffer for capturing said trace data for said trace event of said plurality of trace events and not committing to said memory said invalid path.

7. A method according to claim 6, wherein said program comprises a hardware managing and monitoring program, wherein said first module comprises an external tracing module; and wherein said second module comprises a tracing module associated with said hardware managing and monitoring program.

8. A computer system for dynamically adjusting trace buffer capacity based on execution history, said computer system comprising:

a central processing unit;

an engine deployed on said computer system, said engine being configured to generate a plurality of traces pertaining to one or more trace events generated during execution by said central processing unit of a program being traced, said one or more trace events generated including panel data and sequence data;

a first tool deployed on said computer system for execution by said central processing unit, said tool being configured to capture trace data from said plurality of traces generated by said engine, said first tool further comprising:
a storage module configured to store in a trace buffer said trace data captured from said plurality of traces received;
a path validation module configured to determine whether or not a path for a trace event of said one or more trace events is a new path; and
a buffer adjustment module configured to dynamically adjust an initial size of said trace buffer, if said path for said trace event of said one or more trace events is determined by said path validation module to be said new path, wherein said buffer adjustment module temporarily increases said initial size of said trace buffer when said trace event of said one or more trace events is determined by said path validation module to be said new path.

9. The computer system according to claim 8, wherein said path validation module is further configured to determine whether or not said new path is a valid path and is further configured to commit to memory said new path, if said new path is determined to be said valid path.

10. The computer system according to claim 9, wherein said buffer adjustment module is further configured to restore said initial size of said buffer upon determination that said new path is said valid path, if said new path is determined to be said valid path.

11. The computer system according to claim 10, wherein said buffer adjustment module is further configured to maintain increase of said initial size of said buffer upon determination that said new path is not said valid path and is configured to not commit to said memory said invalid path.

12. The computer system according to claim 11, wherein said first tool further comprises:
a communication module configured to communicate said plurality of traces received to a second tool.

13. The computer system according to claim 12, wherein said program comprises a hardware managing and monitoring program, wherein said engine comprises a tracing engine, wherein said first tool comprises an external tracing module, and wherein said second tool comprises a tracing module associated with said hardware managing and monitoring program.

14. A computer program product for dynamically adjusting trace buffer capacity based on execution history, said computer program product comprising:
a non-transitory computer readable medium storing:
first program instructions to receive into a first tool a plurality of traces pertaining to one or more trace events generated during execution of a program being traced, said one or more trace events generated including panel data and sequence data;
second program instructions to determine, using trace data captured from said plurality of traces received into said first tool, whether or not a path for a trace event of said one or more trace events is a new path; and
third program instructions to dynamically adjust an initial size of a trace buffer configured to store said trace data captured, if said path for said trace event is determined to be said new path, wherein said initial size of said trace buffer is temporarily increased when said trace event of said one or more trace events is determined to be said new trace event based on execution history of said program being traced, and wherein said first, second and third program instructions are recorded on said computer readable medium.

15. The computer program product according to claim 14, further comprising:
fourth program instructions to restore said initial size of said trace buffer temporarily increased when said new path is determined to be a valid path, said fourth program instructions including instructions to commit to memory said valid path, and wherein said fourth program instructions are recorded on said computer readable medium.

16. The computer program product according to claim 15, wherein said first program instructions include instructions to store said trace data captured for said plurality of traces generated during execution of said program in said trace buffer within a data storage system.

17. The computer program product according to claim 16, wherein said first program instructions include instructions to forward, to a second tool configured to trace, said plurality of traces pertaining to said one or more trace events generated during execution of said program being traced.

18. The computer program product according to claim 17, wherein said second program instructions include instructions to maintain said initial size of said trace buffer for capturing said trace data for said plurality of trace events, if said path for said trace event of said plurality of trace events is determined not to be said new path, said second program instructions including instructions to not commit to said memory said invalid path.

19. The computer program product according to claim 18, wherein said third program instructions include instructions to restore said initial size of said trace buffer temporarily increased for capturing said trace data for said trace event of said plurality of trace events, if said new path for said trace event of said plurality of trace events is determined to be a valid path.

20. The computer program product according to claim 19, wherein said program comprises a hardware managing and monitoring program, wherein said first tool comprises an external tracing module, and wherein said second tool comprises a tracing module associated with said hardware managing and monitoring program.

* * * * *